United States Patent
Drelich

[15] 3,649,330
[45] Mar. 14, 1972

[54] COMPOSITION CONTAINING METAL SALTS AND METHOD OF UTILIZING THE SAME TO CONTROL RESIN DEPOSITION

[72] Inventor: Arthur Herbert Drelich, Plainfield, N.J.
[73] Assignee: Johnson & Johnson
[22] Filed: Feb. 18, 1969
[21] Appl. No.: 800,265

Related U.S. Application Data

[63] Continuation-in-part of Ser. No. 618,317, Feb. 24, 1967, abandoned.

[52] U.S. Cl. ............................117/38, 117/56, 117/60, 117/62, 117/145, 117/155 UA
[51] Int. Cl. ............................B41m 7/00, B44d 1/092
[58] Field of Search ............260/29.6 MM, 29.7 M; 117/145, 117/155 UA, 161 UB, 56, 60, 62.1, 62.2, 38, 62

[56] References Cited

UNITED STATES PATENTS

| | | | |
|---|---|---|---|
| 1,818,466 | 8/1931 | Dreyfus et al. | 117/56 UX |
| 2,176,053 | 10/1939 | Billing | 117/56 UX |
| 2,632,699 | 3/1953 | Fowler et al. | 260/29.6 X |
| 2,715,078 | 8/1955 | Cohen | 117/56 |
| 2,760,884 | 8/1956 | Graf | 260/29.6 UX |
| 2,864,723 | 12/1958 | Fluck et al. | 117/56 X |
| 3,046,078 | 7/1962 | Salsbury et al. | 117/56 X |
| 3,144,377 | 8/1964 | Eastes | 117/60 X |
| 3,332,794 | 7/1967 | Hart | 117/62.1 X |

FOREIGN PATENTS OR APPLICATIONS

| | | | |
|---|---|---|---|
| 735,234 | 8/1955 | Great Britain | 117/62.1 |
| 876,283 | 8/1961 | Great Britain | 260/29.7 |

*Primary Examiner*—William D. Martin
*Assistant Examiner*—M. R. Lusignan
*Attorney*—Alexander T. Kardos and Robert L. Minier

[57] ABSTRACT

A new composition of an emulsion polymerized resin and certain metal salts, wherein the metal ion has a valence of at least 3; and a method of controlling resin deposition on materials by pretreating the materials whereby they have an alkaline condition and by applying the new composition to the material under alkaline conditions.

13 Claims, No Drawings

COMPOSITION CONTAINING METAL SALTS AND METHOD OF UTILIZING THE SAME TO CONTROL RESIN DEPOSITION

This patent application is a continuation-in-part of copending patent application, Ser. No. 618,317 filed Feb. 24, 1967, now abandoned.

This invention relates to resin compositions useful in depositing the resin on other materials in a controlled manner and to a method for controlling the deposition of a resin on other materials under alkaline conditions.

Emulsion polymerized resins are widely used throughout many industries. They have found use in the coating industries for the coating of woven fabrics, paper and other materials. The resins are also used as adhesives for laminating materials or for bonding fibrous webs. These resins have also found wide use as additives in the manufacture of paper, the printing industry and the decorative printing of textiles.

In most instances the resin is dispersed in water and when applied from the aqueous solution is carried by the water until the water is driven off. If it is desired to place the resin on the surface of porous or absorbent sheet material the material tends to absorb the water and carry the resin into the material rather than depositing the resin merely on the surface. If such resins are used in bonding nonwoven fabrics, especially in pattern bonding, the water tends to wick along the fibers and carry the resin with it, although placed in a specific pattern, the pattern will spread due to the diffusion of the water and resin until the water is driven off.

I have now discovered a resin composition and the manner for applying such resin composition to other materials so that the resin may be deposited in a controlled manner. If it is desired that the resin only be placed on the surface of a material, my composition and method will allow this to be done. Furthermore, if it is desired that the resin be impregnated throughout the material, again, my composition and method will allow this to be done.

Many papers today are made with resin additives to give the paper various qualities and properties. A major problem in the formation of such papers is the uniformity of the paper. By utilizing my resin compositions in the formation of such papers, highly uniform papers may be produced. By adding my resin compositions to the fiber slurries as the papers are being formed, I can control the deposition of the resin on the paper fibers.

Emulsion polymerized resins are also used in the printing industry and the utilization of my resin compositions in accordance with my method improves the clarity of the print and allows control of the printing process.

The resins which may be used in accordance with the present invention are emulsion polymerized resins which are stable under acid conditions, i.e., an environment with a pH below 7. These resins are generally produced by emulsifying the monomers, stabilizing the emulsion by various surfactant systems and then polymerizing the monomers in the emulsified state to form a solid resin polymer. The solid polymer is usually dispersed in an aqueous medium as discrete particles of colloidal dimensions (1 to 2 microns diameter or smaller) and is generally termed throughout the industry a "resin emulsion" or "latex."

In accordance with the present invention I have discovered a new composition of an acid-stable resin dispersion having a pH of less than 7. The dispersion comprises from about 0.1 percent to about 75 percent by weight of emulsion polymerized resin solids and from about 0.01 percent to about 10 percent by weight of the resin solids of a water soluble metal salt. The metal ion of the salt has a valence of at least +3 and the metal salt is capable of forming an insoluble oxide, hydroxide, or hydrated oxide under alkaline conditions.

I have further discovered that if the resin composition is utilized in applying resins to other materials, the deposition of the resin and its migration or spreading tendencies on such other materials may be controlled by applying the acid-stable resin dispersion to the other material while substantially simultaneously raising the pH of the dispersion to a value greater than 7. For example, if it is desired to apply the resin merely to the surface of the other material, the pH of the other material is raised to greater than 7 and the acid-stable dispersion having a pH less than 7 is applied to the other materials by spraying techniques or by other methods which apply the resin dispersion basically only on the surface of the other materials. Microscopic inspection of the other materials and the resin which has been sprayed thereon will reveal that the resin has not penetrated into the material to any degree. This, of course, is due to the fact that the resin dispersion is stable as long as its pH remains on the acid side, that is, below 7. However, upon contacting the other material having a pH greater than 7, the pH of the resin dispersion is raised to greater than 7, its stability vanishes, and it figuratively "freezes" in position whereby any migration or penetration inwardly from the point of initial deposition by the resin dispersion is instantly stopped.

Further, if the application of the resin employs a conventional rotogravure process using a conventional engraved roll wherein a pattern is impressed and printed on the material, as described in Example II, to be referred to hereinafter, the resin print pattern will penetrate through the material completely due to the normal pressure of the print roll and will coagulate instantly and be fixed in place with minimal migration or lateral spread. Microscopic inspection of the material and the resin thereon will reveal that the resin has penetrated directly and completely through to the other surface of the material but with virtually no migration or lateral spread from the point of initial deposition.

On the other hand, if the material has or is given a pH of less than 7 and the resin dispersion which, of course, also has a pH of less than 7 is applied by a conventional engraved print roll in a rotogravure process, the acid stable dispersion will retain its stability after deposition and its tendency to migrate or spread laterally will continue to exist. Therefore, the other material and the resin dispersion must be substantially immediately treated to raise the pH to greater than 7. The resin will then be deposited through the other material from the top surface to the bottom in the print patterns of the engraved print roll but the substantially immediate conversion to a system having a pH greater than 7 will immediately stop any migration or lateral side spread from the point of initial deposition.

The principles of the present invention also find application in impregnation or "over-all" bonding processes, wherein a fibrous material is passed into and through an impregnating bath of the acid-stable resin dispersion. It has been noted that the resin dispersion which substantially completely impregnates the fibrous material has a tendency to migrate to the surfaces thereof, particularly during the drying process, leaving the center with a lesser concentration of resin solids, and creating a so-called normally objectionable "soft-center." If the overall bonded and impregnated material is treated with an alkali to raise the pH to above 7, before the drying step is initiated, then the impregnating resin dispersion is again "frozen" in place and there is substantially no tendency of the resin dispersion to migrate to the surfaces and create a "soft-center" during the drying operation. Other variations will, of course, be readily apparent to one skilled in the art.

In the dispersion of the emulsion polymerized, colloidal resin particles, there exists around each particle, an electrokinetic charge generally called the Zeta Potential. In most colloids this charge is negative and tends to cause the particles to repel each other and hence, stay in the dispersed form. It is believed that the addition of the salts, as described above, to the colloidal resin dispersion allows this Zeta Potential to be controlled by controlling the pH of the dispersion. When the pH of the dispersion is brought to above about 7 in the presence of the appropriate metal salt, the Zeta Potential of the colloidal resin particles is reduced to substantially zero and the individual particles no longer repel each other. The dispersion becomes unstable and the deposition of the resin on other substances may be controlled. This, of course, is only one suspected theory as to why my new composition allows for controlled resin deposition.

The salts used in accordance with the present invention are the salts of metals, wherein, the cation has a positive valence of 3 or higher. Suitable examples of such metals are zirconium, thorium, aluminum, iron, chromium, etc. The salt may be a sulfate, acetate, nitrate, chloride, etc., or virtually any salt so long as the metal ion has a positive valence of 3 or greater. The salt must be capable of forming an insoluble oxide, hydroxide or hydrated oxide under alkaline conditions.

The amount of salt used will vary in accordance with the resin used and with the degree of control of the resin deposition that is desired. From about 0.01 percent to 10 percent or even higher by weight of the amount of resin solids present of metal salt may be used in accordance with the present invention. The control at the lower percentages of salt may be difficult in some instances and it is preferred to keep this lower limit above about 0.1 percent. It is uneconomical to use the higher amounts of salts especially in view of the relative cost of some of the salts compared to the resin and hence, it is preferred to keep the upper limit at 2 percent or less.

The resins which may be used in the method of the present invention are the emulsion polymerized resins which are in the form of solid resin particles dispersed in a liquid which is usually water. These resin dispersions or resin emulsions as they are called, are stabilized by various types of surfactant systems and the dispersion is stable under acid conditions. Suitable examples would be the polyvinyl chlorides, polyvinyl acetates, polyacrylic resins, etc. Materials such as natural rubber or synthetic rubber are unsuitable for use in accordance with the present invention as they have oleates or soaps present which appear to disrupt the mechanism of the present invention.

The resin emulsion may be anionic or nonionic or in fact may be polyionic so long as it is stable under the acid conditions. By being stable under acid conditions it is meant that the resin dispersion will remain in the dispersed state at pH's of from 7 or slightly less than 7 down to the very acid pH's of from 7 or slightly less than 7 down to the very acid pH's, such as 2 or 3.

Generally, the particle size in the resin dispersions will vary from about 1/10th of a micron or smaller to 3 to 5 microns in size. And the amount of resin solids in the dispersion will vary from 1/10th of a percent solids up to 60 percent or even higher solids, generally dependent upon the resin used, the surfactant system used and the conditions under which the resin is polymerized.

The salt may be added to the resin dispersion either in its solid form or it may be initially dissolved in water and the salt solution added to the resin dispersion.

The resin dispersion is stable as long as the pH is less than 7, however, once the pH is raised to greater than 7, it appears that the Zeta Potential of the resin particles is reduced and possibly brought to zero which causes the resin particles to conglomerate or coagulate. If the surface of a fibrous web contains an alkali and the composition of resin and metal salt as previously described is placed on the web, the particles will immediately be attracted to the fibers and coagulate on the surface of the fibers.

The pH may be raised by any of the known alkalies such as ammonium hydroxide, sodium hydroxide, potassium hydroxide, lithium hydroxide, sodium carbonate or any other material which will give a pH of greater than 7. The alkali and amount of alkali used is controlled by economics and by the effect the alkali may have on the other material, for example, sodium hydroxide can do great damage to cotton fibers and will interfere with the curing of many resins. It will be readily apparent to one skilled in the art that suitable alkalies and concentrations may be chosen dependent on the material to be treated.

In some instances the resin may contain active cross-linking comonomers, such as the acrylic resins having N-methylol acrylamide or other type groups. When such resins are used in the presence of certain metal salts, especially zirconium salts, the zirconium may cross-link and form various complexes with these resins which in turn improves the binding properties of the resin. It appears to be immaterial whether the metal salt cross-links or does not cross-link the resin as far as controlling the deposition of the resin in accordance with the present invention.

The invention will be further illustrated in greater detail by the following specific examples. It should be understood, however, that although these examples may describe in particular detail some of the more specific features of the invention they are given primarily for purposes of illustration and the invention in its broader aspects is not to be construed as limited thereto.

EXAMPLE I

A pad of woodpulp fibers is sprayed with a dilute ammonium hydroxide solution containing about 5 percent ammonia. A resin emulsion containing about 20 percent acrylic polymer solids, 1 percent by weight of the solids of zirconium sulfate and a blue pigment is sprayed on the woodpulp pad. The resin emulsion has a pH of about 3. The pad is dried and examined. By observation the blue color indicates the resin is in the form of spherical particles on the outside fiber layer of the pad. The pad is soft yet has sufficient strength and absorbency to be useful as a sanitary pad. The above experiment is repeated with the exception that the zirconium sulfate is omitted. The resultant pad has a film of resin which has penetrated the woodpulp pad rendering the pad stiff, water repellent and unsuitable for use as a sanitary pad.

EXAMPLE II

A web of 100 percent rayon fibers, 1½ denier and 1½ inch in length is print-bonded by the rotogravure process using an engraved roll having six horizontal wavy lines per inch. The width of each line is about 0.018 inch. The composition of the resin used for the print-bonding is:

| | |
|---|---|
| Self-cross-linking acrylic polymer, predominately polyethyl acrylate polymerized with an anionic surfactant system | 40.3% |
| Ammonium Chloride catalyst | 0.4% |
| Antifoaming agent | 0.4% |
| Zirconium Sulfate | 0.6% |
| Water | 57.9% |
| Blue Pigment | 0.4% |

In formulating the resin the pH is brought to about 7 before the Zirconium sulfate is added. The pH of the final formulated resin dispersion is about 2.5.

The rayon web is passed through a dilute solution of ammonium hydroxide in a mangle and the binder printed onto the wet, ammonial web. The binder coagulates instantly, fixing the resin in place with minimal lateral spread. The printed web is dried and cured. The resultant fabric weighs about 250 grains per square yard.

A swatch of the resultant fabric is stained to accurately determine the location of the binder stripes. The binder stripe has a width of from about 0.032 inch to 0.036 inch. The softness of the fabric is measured with a Thwing-Albert Handle-O-Meter as about 82¼ units and the cross tensile strength of eight plies of the fabric each 1 inch wide is 2.5 pounds.

EXAMPLE III

A fabric made as described in conjunction with Example II is made with the following differences:
1. no Zirconium sulfate is used in the resin formulation,
2. the web is not treated with ammonium hydroxide, and
3. four lines per inch instead of six lines per inch are used in the print-bonding pattern.

A swatch of the resultant fabric is stained to determine binder stripe width which is about 0.156 inch to 0.175 inch. The softness of the fabric is measured with a Thwing-Albert Handle-O-Meter as about 83½ units and the cross-tensile strength of eight plies of the fabric each 1 inch wide is 1.8 pounds.

EXAMPLE IV

Four different fabrics are made using similar base webs of 100 percent rayon fibers, 1½ denier and 1½ inch in length. Each fabric is print bonded with a self cross-linking acrylic resin of polyethyl acrylate polymerized with a nonionic surfactant system. Two of the fabrics are bonded in a six-line-per-inch pattern described in Example II and the other two fabrics are bonded with a similar pattern having only four lines per inch. In bonding one six-line-per-inch fabric and one four-line-per-inch fabric about 0.2 percent by weight of the resin of zirconium sulfate is added to the resin emulsion and the web is treated with dilute ammonium hydroxide immediately prior to printing it with the resin emulsion. In the other six-line-per-inch fabric and four-line-per-inch fabric the zirconium sulfate and ammonium hydroxide treatment are omitted.

Each of the resultant fabrics is tested for tenacity in the machine and cross-directions and for stiffness in the machine and cross-directions. The tenacity is determined by finding the force required to break the fabric divided by the weight of the fabric. The stiffness is determined by measuring the force required to flex the fabric, i.e., the flexural resistance.

The following table gives the comparative results of the four different fabrics tested.

TABLE

| Sample No. | Zirconium sulfate and ammonium hydroxide treatment | Print pattern (lines/inch) | Weight (grains/sq. yd.) | Tenacity (pounds/in/100 grains) | | Stiffness (mg. force) | |
|---|---|---|---|---|---|---|---|
| | | | | Machine direction | Cross-direction | Machine direction | Cross-direction |
| 4a | No | 4 | 670 | .58 | .052 | 30 | 2 |
| 4b | Yes | 4 | 580 | .71 | .074 | 7 | 1.1 |
| 4c | No | 6 | 720 | .60 | .079 | 32 | 3 |
| 4d | Yes | 6 | 610 | .74 | .081 | 9 | 0.7 |

As may be readily seen from the above table the addition of zirconium sulfate and the ammonium hydroxide treatment produces fabrics with higher tenacity in both the machine and cross-directions as well as fabrics which are not as stiff.

What is claimed is:

1. A method of applying an emulsion polymerized resin in a print pattern to fibrous materials which comprises: adding to a stable liquid dispersion having a pH of less than 7 and containing from about 0.1 percent to 75 percent emulsion polymerized resin solids from about 0.01 percent to 10 percent by weight of the resin of a water soluble metal salt, the metal ion of said salt having a valence of at least +3 and said metal salt being capable of forming an insoluble oxide, hydroxide, or hydrated oxide under alkaline conditions; applying said resin dispersion containing said metal salt to said fibrous materials in a print pattern; and substantially simultaneously raising the pH of said resin dispersion to more than 7 by treating the same with an alkali which will give a pH of greater than 7, whereby the resin dispersion coagulates immediately in place in said print pattern on said fibrous materials with a minimum of migration or lateral side spread from the point of initial application; and thereafter drying said fibrous materials whereby they are soft, unstiffened, and possess good tenacity in both the machine and cross directions.

2. A method according to claim 1, wherein the alkali is ammonium hydroxide.

3. A method according to claim 1, wherein from about 0.1 percent to 2 percent by weight of the resin of the water soluble metal salt is added to the resin dispersion.

4. A method according to claim 1, wherein the resin dispersion is applied to the fibrous materials by a spraying step.

5. A method according to claim 1, wherein the resin dispersion is applied to the fibrous materials by a rotogravure process using a print roll.

6. A method according to claim 1, wherein the water soluble metal salt is a zirconium salt.

7. A method according to claim 1, wherein the water-soluble metal salt is zirconium sulfate.

8. A method as defined in claim 1, wherein the fibrous materials comprise a cellulosic substrate.

9. A method of applying an emulsion polymerized resin in a print pattern to fibrous materials which comprises: treating fibrous materials with an alkali to give a pH thereto greater than 7; applying to said treated fibrous materials in a print pattern a stable liquid dispersion having a pH of less than 7 and containing (1) from about 0.1 percent to about 75 percent by weight of emulsion polymerized resin solids and (2) from about 0.01 percent to about 10 percent by weight of said resin of a water-soluble metal salt, the metal ion of said salt having a valence of at least +3 and said metal salt being capable of forming an insoluble oxide, hydroxide or hydrated oxide under alkaline conditions, whereby the pH of said dispersion is substantially simultaneously raised to more than 7 and said dispersion coagulates immediately in place in said print pattern on said fibrous materials with a minimum of migration or lateral side spread from the point of initial application; and thereafter drying said fibrous materials whereby they are soft, unstiffened, and possess good tenacity in both the machine and cross directions.

10. A method as defined in claim 9 wherein the alkali is ammonium hydroxide.

11. A method as defined in claim 9 wherein the water-soluble metal salt is a zirconium salt.

12. A method as defined in claim 9 wherein the water-soluble metal salt is zirconium sulfate.

13. A method as defined in claim 9 wherein the fibrous materials comprise a cellulosic substrate.

* * * * *